E. S. MORRELL.
JUNCTION BOX COUPLING.
APPLICATION FILED SEPT. 25, 1908.
915,990.
Patented Mar. 23, 1909.
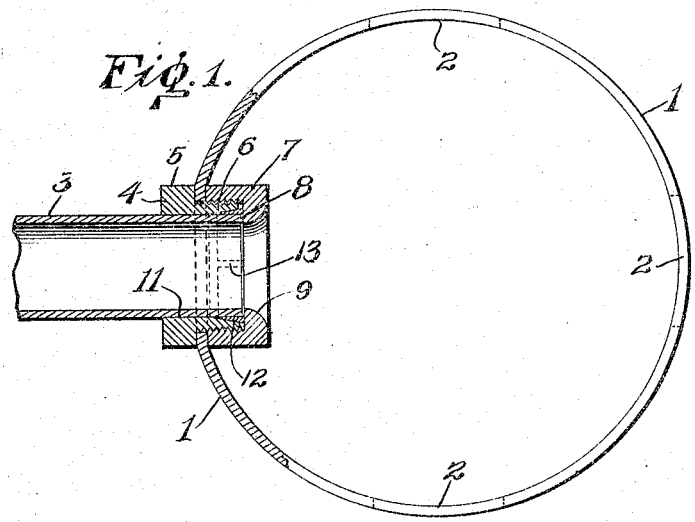
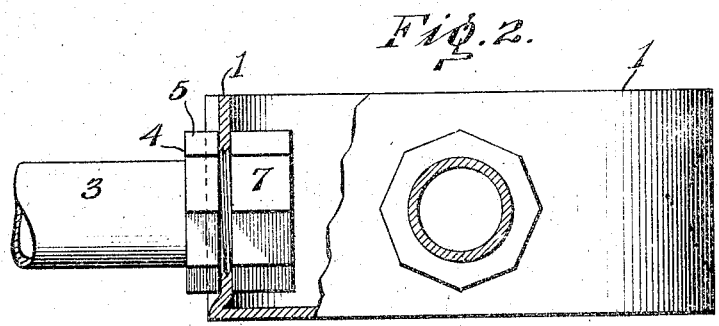
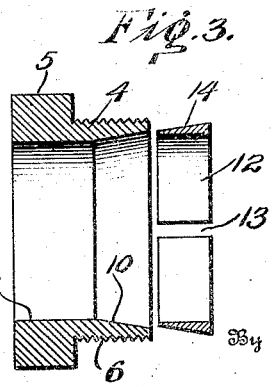
Witnesses
Daniel Webster, Jr.
Anna E. Steinbock
Inventor
Edward S. Morrell
By Cornelius D. Ehret
His Attorney

UNITED STATES PATENT OFFICE.

EDWARD S. MORRELL, OF PHILADELPHIA, PENNSYLVANIA.

JUNCTION-BOX COUPLING.

No. 915,990.  Specification of Letters Patent.  Patented March 23, 1909.

Application filed September 25, 1908. Serial No. 454,723.

*To all whom it may concern:*

Be it known that I, EDWARD S. MORRELL, a citizen of the United States, residing in the city of Philadelphia, county of Philadelphia, and State of Pennsylvania, have invented a new and useful Junction-Box Coupling, of which the following is a specification.

My invention relates to junction box couplings for electric conduit pipes, such as the conduit pipes of junction or outlet boxes commonly used in the concealed electric wiring of buildings.

It is the object of my invention to provide an improved coupling for attaching conduit pipes to outlet or junction boxes which shall be low in cost and so simple in construction as to make the installation or application easy and quick, with a minimum expenditure of time.

To this end my invention comprises the parts hereinafter described and claimed, which permit coupling of a conduit pipe to a junction or outlet box without requiring screw threads upon either the junction box or the conduit pipe.

For an illustration of one of the forms my invention may take, reference is to be had to the accompanying drawing, in which:

Figure 1 is a top plan view, partly in section, of a junction or outlet box, the conduit pipe and coupling being shown in horizontal section. Fig. 2 is a side elevation of a junction or outlet box, part of the box being shown in section with the conduit pipe and coupling in elevation. Fig. 3 is a longitudinal section of two of the coupling elements.

Referring to the drawing, a junction or outlet box 1, of any suitable type and of any suitable shape, here shown circular by way of example, has a plurality of openings 2 to receive the conduit pipes, as 3. The conduit pipe 3, shown in section in Fig. 1 and in elevation in Fig. 2, has placed over the end thereof the interiorly smooth and exteriorly screw-threaded nipple 4 having a hexagonal, octagonal, or other shaped head 5, and an exteriorly screw-threaded shank 6, adapted to receive the interiorly screw-threaded nut 7. The nut 7 has an interior shoulder 8 and a flaring or filleted opening 9, of a diameter approximately equal to the internal diameter of the pipe 3. The bore of the nipple 4 tapers or flares at 10, as best seen in Fig. 3, the principal portion of the bore 11 of said nipple being smooth and adapted to just freely pass over the end of the exteriorly-smooth or non-threaded pipe 3. A ring 12, circumferentially resilient, because of its discontinuity or slot 13, is interiorly smooth to contact with the exterior of the smooth and non-threaded pipe 3. Exteriorly, the ring 12 is also smooth but has a taper 14 adapted to enter the flare 10 of the nipple 4, as best seen in Fig. 3.

In applying the coupling, the wireman or workman is not required to thread the end of the pipe 3 but uses it smooth or as it comes from stock or the market. Over this he slips the nipple 4 bringing the end of the nipple approximately to the end of the pipe 3, both pipe 3 and the nipple 4 extending through the opening in the wall of the junction box 1. The split ring 12 is then slipped into place and finally the nut 7 is screwed up. As the nut 7 advances the shoulder 8 thereof forces the ring 12 into the flare 10 of the nipple 4. In so doing the ring 12 becomes of smaller and smaller diameter, the slot or opening 13 becomes less and less until the interior surface of the ring 12 firmly grips the non-threaded exterior of the pipe 3. The nut 7 at the time the pipe 3 is firmly gripped by the ring 12, or shortly thereafter, clamps the wall of the junction box 1 between itself and the shoulder or head on the nipple 4, as shown in Fig. 1. By this arrangement, the pipe 3 is firmly clamped to the box 1, and this without recourse to screw threads upon the pipe 3 or upon the box 1.

What I claim is:

1. The combination with a non-threaded junction box having an opening, of a non-threaded conduit pipe, an interiorly smooth nipple upon said pipe and extending through said opening, a nut adapted to advance upon said nipple, a resilient clamping member held between said nut and nipple and advanced by said nut to clamp said pipe, and said junction box being clamped between said nut and nipple.

2. The combination with a non-threaded junction box having an opening, of a non-threaded conduit pipe, a nipple upon said pipe and extending through said opening, said nipple and the exterior of said pipe having a tapering opening formed between them, a tapering resilient ring adapted to enter said tapering opening, a nut adapted to advance upon said nipple to force said ring into said opening and to clamp said pipe, and to clamp said box between said nipple and nut.

3. A coupling for attaching non-threaded conduit pipes to junction boxes comprising an interiorly smooth and exteriorly threaded shouldered nipple, said nipple having an enlargement in its bore to form an opening between the inner wall of said nipple and the exterior of a non-threaded pipe, a resilient ring adapted to enter said enlargement, and a nut adapted to advance upon the screw threads of said nipple to force said ring into said opening and to clamp to the pipe and adapted to secure a junction box against the nipple shoulder.

In testimony whereof I have hereunto affixed my signature in the presence of the two subscribing witnesses.

EDWARD S. MORRELL.

Witnesses:
ANNA E. STEINBOCK,
DANIEL WEBSTER, Jr.